(12) United States Patent
Mola

(10) Patent No.: US 12,332,809 B2
(45) Date of Patent: *Jun. 17, 2025

(54) LOGGING CACHE LINE LIFETIME HINTS WHEN RECORDING BIT-ACCURATE TRACE

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,454

(22) Filed: Apr. 17, 2024

(65) Prior Publication Data

US 2024/0264951 A1 Aug. 8, 2024

Related U.S. Application Data

(63) Continuation of application No. 18/548,320, filed as application No. PCT/US2022/021099 on Mar. 21, 2022, now Pat. No. 11,989,137.

(30) Foreign Application Priority Data

Mar. 31, 2021 (LU) .......................................... 102722

(51) Int. Cl.
*G06F 12/128* (2016.01)
*G06F 12/0895* (2016.01)

(52) U.S. Cl.
CPC ........ *G06F 12/128* (2013.01); *G06F 12/0895* (2013.01)

(58) Field of Classification Search
CPC ............. G06F 11/3037; G06F 11/3466; G06F 11/3636; G06F 12/0811; G06F 12/0895; G06F 12/128; G06F 2201/885
See application file for complete search history.

(56) References Cited

U.S. PATENT DOCUMENTS

| | | | |
|---|---|---|---|
| 11,720,444 B1* | 8/2023 | Naaman | G06F 11/1068 714/764 |
| 2020/0050541 A1* | 2/2020 | Johannes de Jong | G06F 12/126 |

* cited by examiner

*Primary Examiner* — Aracelis Ruiz
(74) *Attorney, Agent, or Firm* — Workman Nydegger

(57) ABSTRACT

Logging cache line lifetime hints when recording an execution trace. A microprocessor detects occurrence of a first cache event that initiates a lifetime of a cache line within a memory cache, and initiates logging first trace information indicating a beginning of the lifetime of the cache line within the memory cache. Subsequently, the microprocessor detects occurrence of a second cache event that ends the lifetime of the cache line within the memory cache. Based on detecting the second cache event, the microprocessor initiates logging second trace information indicating an ending of the lifetime of the cache line within the memory cache.

15 Claims, 7 Drawing Sheets

LOGGING CACHE LINE LIFETIME HINTS WHEN RECORDING BIT-ACCURATE TRACE

CROSS-REFERENCE TO RELATED APPLICATIONS

This application is a continuation of U.S. application Ser. No. 18/548,320, filed Aug. 29, 2023, now U.S. Pat. No. 11,989,137, issued May 21, 2024, and entitled "LOGGING CACHE LINE LIFETIME HINTS WHEN RECORDING BIT-ACCURATE TRACE," which is a U.S. National Stage of International Application No. PCT/US2022/021099, filed on Mar. 21, 2022, designating the United States and claiming the priority of Luxembourg Patent Application No. LU102722 filed with the Luxembourg Intellectual Property Office on Mar. 31, 2021. All of the aforementioned applications are incorporated herein in their respective entirety by this reference.

TECHNICAL FIELD

The present disclosure relates to systems, methods, and devices that record execution traces based on logging processor caching activity.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using "bit-accurate" trace data, diagnostic tools enable developers to reason about a recorded prior execution of subject context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based largely on recording influxes to a microprocessor's (processor's) memory cache. However, since modern processors commonly execute at the rate of tens- to hundreds-of thousands of MIPS (millions of instructions per second), replayable execution traces of a program's thread can capture vast amounts of information, even if mere fractions of a second of the thread's execution are captured. As such, replayable execution traces quickly grow very large in size in memory and/or on disk.

BRIEF SUMMARY

At least some embodiments described herein operate to log cache line lifetime hints when recording execution traces. In embodiments, these logged cache line lifetime hints enable the identification of a time-window (and even multiple discontinuous time-windows) during which a logged value of a cache line is valid from a trace replay perspective. Based on identified cache events, embodiments log cache line lifetime hints that are at least sufficient to identify a time-window (and even multiple discontinuous time-windows) during which a cache line value captured by an execution trace is guaranteed be the value that hardware stored during corresponding time-window(s) of execution time during trace recording. Some additional embodiments log cache line lifetime hints that are additionally sufficient to expand at least one of these time-window(s) to also include at least one period of execution time during which the logged value of a cache line can also be trusted for replay purposes, even if that value does not necessarily match the value that the hardware stored during corresponding time-window(s) of execution time during trace recording. In these additional embodiments, the logged cache line lifetime hints record at least one of (i) a first moment that the logged cache line value is valid for replay purposes, or (ii) a last moment that the logged cache line value is valid for replay purposes.

Notably, logging cache line lifetime hints that enable one or more windows of validity to be later identified from execution traces lead to a benefit and technical effect of being able to record an execution trace that is enriched with data that facilitates trace analysis. Notably, the logging cache line lifetime hints is intrinsically linked to internal structure and operation of a processor, including internal structure and operation of its cache. For example, in embodiments, cache line lifetime hints precisely capture the beginning and ending of cache line lifetimes as they relate to execution of target code, thereby creating a detailed record of internal operation of relevant portions of a processor during code execution. The manner of the logging cache line lifetime hints therefore takes into account details of internal processor hardware and/or low-level aspects of operation of the processor.

In addition to the technical effects afforded by the logging of cache line lifetime hints into execution traces, the presence of these cache line lifetime hints in an execution trace enables a narrowing of analysis windows (i.e., reduced search spaces) for many types of trace analysis, such as memory leak analysis, data race analysis, etc. These narrowed analysis windows bring about a further technical effect of increased efficiency of trace analysis (e.g., by enabling an analysis to complete while processing/analyzing less trace data than would otherwise be possible), which enables the conservation of computing resources during trace analysis (e.g., less processor utilization, less memory utilization, etc.).

In accordance with the foregoing, some embodiments are directed to methods, systems, and computer program products for logging cache line lifetime hints when recording an execution trace. In one implementation, a microprocessor comprises a processing unit and a memory cache. The microprocessor also comprises control logic that configures the microprocessor to, based on executing a first instruction at the processing unit, detect occurrence of a first cache event that initiates a lifetime of a cache line within the memory cache. The control logic also configures the microprocessor to, based on detecting the first cache event, initiate logging, into an execution trace, first trace information indicating a beginning of the lifetime of the cache line within the memory cache. The control logic also configures the microprocessor to, subsequent to initiating logging of the first trace information and based on executing a second instruction at the processing unit, detect occurrence of a second cache event that ends the lifetime of the cache line within the memory cache. The control logic also configures the microprocessor to, based on detecting the second cache event, initiate logging, into the execution trace, second trace information indicating an ending of the lifetime of the cache line within the memory cache.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
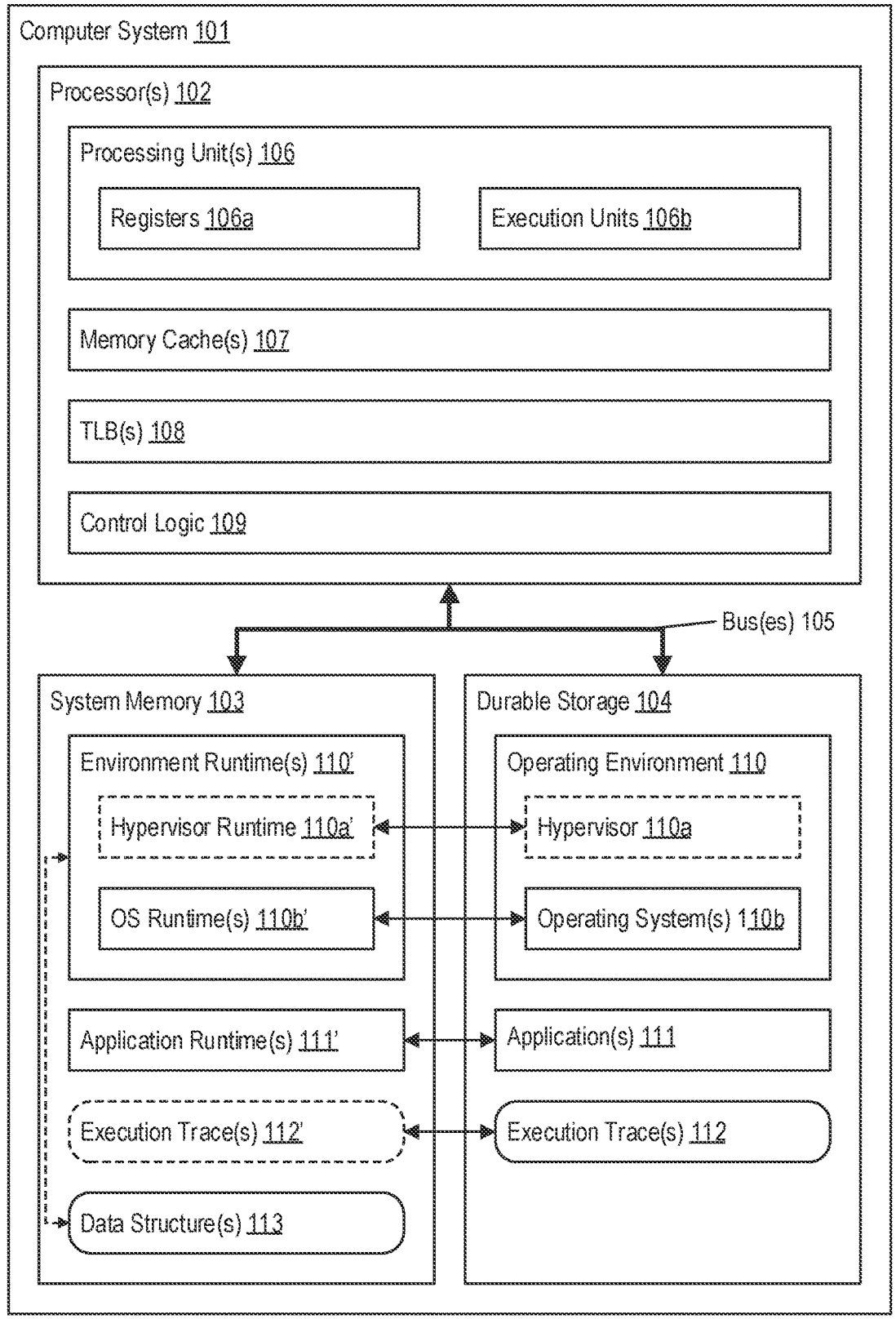
FIG. 1A illustrates an example computing environment that facilitates logging cache line lifetime hints when recording an execution trace.

FIG. 1A illustrates an example computing environment 100 that facilitates logging cache line lifetime hints when recording an execution trace. Logging cache line lifetime hints enables one or more cache line lifetimes to be later identified from the execution trace, thereby enabling efficient identification of cache line lifetimes, which narrows analysis windows for many types of trace analysis. This increases the efficiency of trace analysis (e.g., by enabling an analysis to complete while processing/analyzing less trace data than would otherwise be possible). Logging cache line lifetime hints therefore also enables the conservation of computing resources during trace analysis (e.g., less processor utilization, less memory utilization, etc.).

As used herein, a cache line "lifetime hint" is one or more indicia, recorded into an execution trace, that captures a moment in execution time at which a cache line lifetime can be considered to begin or end, at least from a trace replay perspective. As used herein, cache line lifetime is an execution duration (i.e., time-window) over which a value captured by an execution trace reflects an actual value in hardware, an execution duration (i.e., time-window) over which a value captured by an execution trace can be relied upon for trace replay—even if that value doesn't reflect the actual value in hardware, or combinations thereof.

As illustrated, computing environment 100 includes a computer system 101 (e.g., a special-purpose or general-purpose computing device), which includes a processor 102 (or a plurality of processors) that is configured to participate in recording an execution trace. As shown, in addition to processor 102, computer system 101 also includes system memory 103 and durable storage 104, which are communicatively coupled to each other, and to the processor 102, using at least one communications bus 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments the processor 102 includes a processing unit 106 (or a plurality of processing units), a memory cache 107 (or a plurality of memory caches), a translation lookaside buffer (TLB) 108 (or a plurality of TLBs), and control logic 109 (e.g., gate logic, executable microcode, etc.). Each processing unit 106 (e.g., processor core) loads and executes machine code instructions on at least one of a plurality of execution units 106b. During execution of these machine code instructions, the instructions can use registers 106a as temporary storage locations, and can read and write to various locations in system memory 103 via the memory cache 107. Each processing unit 106 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware storage locations that are defined based on the ISA of the processor 102. In general, registers 106a are read from and/or written to by machine code instructions, or a processing unit 106, as those instructions execute at execution units 106b. Registers 106a are commonly used to store values fetched from the memory cache 107 for use as inputs to executing machine code instructions, to store the results of executing machine code instructions, to store a program instruction count, to support maintenance of a thread stack, etc. In some embodiments, registers 106a include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The memory cache 107 temporarily caches blocks of system memory 103 during execution of machine code instructions by processing unit 106. In some implementations, the memory cache 107 includes one or more "code" portions that cache portions of system memory 103 storing application code, as well as one or more "data" portions that cache portions of system memory 103 storing application runtime data. If a processing unit 106 requests data (e.g., code or application runtime data) not already stored in the memory cache 107, then the processing unit 106 initiates a "cache miss," causing one or more blocks of data to be fetched from system memory 103 and influxed into the memory cache 107—while potentially replacing and "evicting" some other data already stored in the memory cache 107 back to system memory 103.

Figure 2:
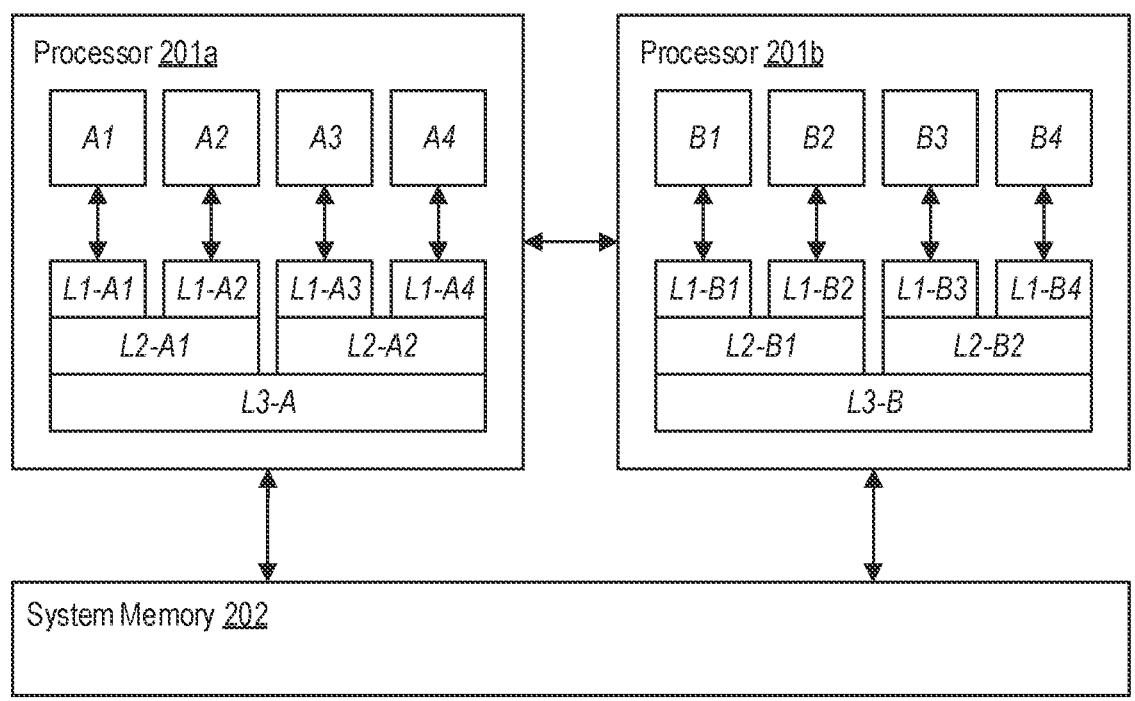
FIG. 2 illustrates an example environment demonstrating multi-level memory caches.

In the embodiments herein, the memory cache 107 comprises multiple cache levels (sometimes referred to cache tiers or cache layers)—such as a level 1 (L1) cache, a level 2 (L2) cache, a level 3 (L3) cache, etc. For example, FIG. 2 illustrates an example environment 200 demonstrating multi-level memory caches. In FIG. 2, the example environment 200 comprises processor 201a and processor 201b (e.g., each a processor 102 in FIG. 1A, and collectively referred to as processors 201) and a system memory 202 (e.g., system memory 103 of FIG. 1A). In the example environment 200, each of processors 201 comprises four processing units (e.g., each a processing unit 106 in FIG. 1A), including processing units A1-A4 for processor 201a and processing units B1-B4 for processor 201b.

In example environment 200, each of processors 201 also includes a three-level memory cache hierarchy. Environment 200 is one example memory cache layout only, and it is not limiting to the memory cache hierarchies in which the embodiments herein may operate. In environment 200, each processing unit includes its own dedicated L1 memory cache (e.g., L1 memory cache "L1-A1" in processor 201a for unit A1, L1 memory cache "L1-A2" in processor 201a for unit A2, etc.). Relative to the L1 memory caches, each of processors 201 also includes two upper-level L2 memory caches (e.g., L2 memory cache "L2-A1" in processor 201a that serves as a backing store for L1 memory caches L1-A1 and L1-A2, L2 memory cache "L1-A2" in processor 201a that serves as a backing store for L1 memory caches L1-A3 and L1-A4, etc.). Finally, relative to the L2 memory caches, each of processors 201 also includes a single L3 memory cache (e.g., L3 memory cache "L3-A" in processor 201a that serves as a backing store for L2 memory caches L2-A1 and L2-A2, and L3 memory cache "L3-B" in processor 201b that serves as a backing store for L2 memory caches L2-B1 and L2-B2).

As shown, system memory 202 serves as a backing store for the L3 memory caches L3-A and L3-B. In this arrangement, and depending on implementation, cache misses in an L1 memory cache might be served by its corresponding L2 memory cache, its corresponding L3 memory cache, and/or system memory 202; cache misses in an L2 memory cache might be served by its corresponding L3 memory cache and/or system memory 202; and cache misses in an L3 memory cache might be served by system memory 202.

In some environments, some memory cache levels exist separate from a processor; for instance, in environment 200 one or both of the L3 memory caches could alternatively exist separate from processors 201, and/or environment 200 could include one or more additional memory caches (e.g., L4, L5, etc.) that exist separate from processors 201.

As demonstrated by the arrows within each of processors 201, when multiple memory cache levels exist, each processing unit typically interacts directly with the lowest level (e.g., L1). In many implementations, data flows between the levels (e.g., an L3 memory cache interacts with the system memory 202 and serves data to an L2 memory cache, and the L2 memory cache in turn serves data to the L1 memory cache). However, as will be appreciated by one of ordinary skill in the art, the particular manner in which processing units interact with a memory cache, and the particular manner in which data flows between memory cache levels, may vary (e.g., depending on whether the memory cache is inclusive, exclusive, or some hybrid).

Given their arrangement, the memory caches in environment 200 may be viewed as "shared" memory caches. For example, each L2 and L3 memory cache serves multiple processing units within a given one of processors 201 and are thus shared by these processing units. The L1 memory caches within a given one of processors 201, collectively, can also be considered shared—even though each one corresponds to a single processing unit—because the individual L1 memory caches may coordinate with each other via a cache coherency protocol (CCP) to ensure consistency (i.e., so that each cached memory location is viewed consistently across all the L1 memory caches). The L2 memory caches within each of processors 201 similarly may coordinate via a CCP. Additionally, each individual L1 memory cache may be shared by two or more physical or logical processing units, such as where the processor supports hyper-threading, and are thus "shared" even at an individual level.

Figure 3:
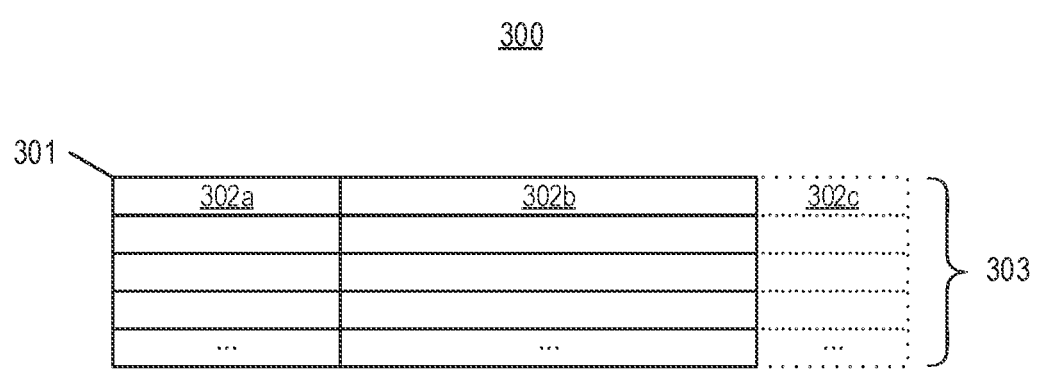
FIG. 3 illustrates an example of a memory cache.

In embodiments, each level of the memory cache 107 comprises a plurality of slots 303 that store cache lines (also commonly referred to as cache blocks). Each cache line corresponds to a contiguous block of system memory 103. For example, FIG. 3 illustrates an example 300 of a memory cache 301 (e.g., an L1 memory cache, an L2 memory cache, etc.) that includes a plurality of slots 303. In example 300, each of slots 303 stores a plurality of portions 302, including at least an address portion 302a that stores a memory address, and a cache line portion 302b that stores cache line data corresponding to that memory address. During an influx to one of slots 303, the cache line portion 302b of the slot is generally filled with a block of data obtained from an upper-level memory cache, or from the system memory 103. Depending on a size of the cache line portion 302b, each of slots 303 may potentially store data spanning a plurality of consecutive individually addressable locations within the system memory 103. The cache line portion 302b of each of slots 303 can be modified by processing unit 106, and eventually be evicted back to an upper-level memory cache, or to the system memory 103. As indicated by the ellipses within the memory cache 301, each memory cache can include a large number of slots. For example, a contemporary 64-bit INTEL processor may contain individual L1 memory caches for each processing unit 106 comprising 512 or more slots. In such a memory cache, each slot is typically used to store a 64-byte (512-bit) value in reference to a 6-byte (48-bit) to 8-byte (64-bit) memory address. As shown, memory caches are generally larger in size (i.e., more slots) as their level increases. For example, an L2 memory cache is generally larger than an L1 memory cache, an L3 memory cache is generally larger than an L2 memory cache, and so on.

As mentioned, memory caches coordinate using a CCP. In general, a CCP defines how consistency is maintained between various memory caches as various processing units read from and write data to those caches, and how to ensure that the processing units always read consistent data for a given cache line. CCPs are typically related to, and enable, a memory model defined by the processor's instruction set architecture (ISA). Examples of popular ISA's include the x86 and x86_64 families of architectures from INTEL, and the ARM architecture from ARM HOLDINGS. Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual cache line stored in a shared memory cache. A "modified" cache line contains data that has been modified in the shared memory cache and is therefore inconsistent with the corresponding data in the backing store (e.g., system memory 103 or another memory cache). When a cache line having the "modified" state is evicted from the shared memory cache, common CCPs require the cache to guarantee that its data is written back the backing store, or that another memory cache take over this responsibility. A "shared" cache line is not permitted to be modified and may exist in a shared or owned state in another memory cache. The shared memory cache can evict this data without writing it to the backing store. An "invalid" cache line contains no valid data and can be considered empty and usable to store data from cache miss. An "exclusive" cache line contains data that matches the backing store and is used by only a single processing unit. It may be changed to the "shared" state at any time (i.e., in response to a read request) or may be changed to the "modified" state when writing to it. An "owned" cache location contains data that that is inconsistent with the corresponding data in the backing store. When a processing unit makes changes to an owned cache location, it notifies the other processing units—since the notified processing units may need to invalidate or update based on the CCP implementation.

As shown, each slot in the memory cache 301 may include additional portions 302c (i.e., one or more additional portions). In some embodiments, one of additional portions 302c comprises one or more logging bits used to track whether a cache line stored in a corresponding one of slots 303 has been logged to a trace or not, as described infra. In some embodiments, one of additional portions 302c stores a tag that comprises one or more data fields for storing information relevant to its corresponding slot. In embodiments, the slots of at least one memory cache level comprises an additional portion for storing tags, and those embodiments use those tags to improve trace logging, as described infra.

In some situations, the address portion 302a of each of slots 303 stores a physical memory address, such as the actual corresponding memory address in the system memory 103. In other situations, the address portion 302a of each of slots 303 stores a virtual memory address. In embodiments, a virtual memory address is an address within a virtual address space that is exposed by an operating system to a process executing at the processor 102. This virtual address space provides one or more abstractions to the process, such as that the process has its own exclusive memory space and/or that the process has more memory available to it than actually exists within the system memory 103. Such abstractions can be used, for example, to facilitate memory isolation between different processes executing at the processor 102, including isolation between user-mode processes and kernel-mode processes.

In embodiments, virtual to physical memory address mappings are maintained within one or more memory page tables that are stored in the system memory 103, and that are managed by an operating system and/or hypervisor (e.g., operating environment 110, described infra). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In some implementations, PTEs are part of a multi-level hierarchy, which includes one or more page directory entries (PDEs) that support discovery of individual PTEs.

In embodiments, the TLB 108 facilitates virtual addressing, and is a dedicated form of cache that stores recently obtained PTEs mapping virtual and physical memory pages, as obtained from the memory page tables stored in the system memory 103. In general, when a processing unit 106 accesses a virtual memory address, the processor 102 determines if a physical mapping can be determined from a PTE stored in the TLB 108. If not, the processor 102 performs a "page table walk" of one or more memory page tables stored in system memory 103, in order to identify a relevant mapping between a virtual memory page containing the virtual memory address and a physical memory page containing a corresponding physical memory address. The processor 102 then stores this mapping as an entry within a slot of the TLB 108. In some embodiments, TLB 108 comprises multiple levels, similar to the memory cache 107.

In embodiments, control logic 109 comprises microcode (i.e., executable instructions) and/or physical logic gates that control operation of the processor 102. In general, control logic 109 functions as an interpreter between the hardware of the processor 102 and the processor ISA exposed by the processor 102 to executing applications (e.g., operating environment 110, application 111, etc.) and controls internal operation of the processor 102. In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

The durable storage 104 stores computer-executable instructions and/or data structures representing executable software components. Correspondingly, during execution of these software components at the processor 102, one or more portions of these computer-executable instructions and/or data structures are loaded into system memory 103. For example, the durable storage 104 is illustrated as storing computer-executable instructions and/or data structures corresponding to an operating environment 110 and an application 111 (or a plurality of applications). Correspondingly, the system memory 103 is shown as storing an operating environment runtime 110' (e.g., machine code instructions and/or runtime data supporting execution of operating environment 110), and as storing at least one application runtime 111' (e.g., machine code instructions and/or runtime data supporting execution of application 111). The system memory 103 and durable storage 104 can also store other data, such a replayable execution trace 112 (i.e., replayable execution trace 112' stored in system memory 103 and/or replayable execution trace 112 stored in durable storage 104) and a data structure 113 (or a plurality of data structures) that facilitates communication between operating environment 110 and control logic 109 during tracing of application 111.

In FIG. 1A, operating environment 110 is shown as potentially including a hypervisor 110a, and as including an operating system 110b (or a plurality of operating systems). Correspondingly, the operating environment runtime 110' is shown as potentially including a hypervisor runtime 110a', and as including an operating system runtime 110b'. For example, in some embodiments, the operating environment 110 comprises the hypervisor 110a executing directly on the hardware (e.g., processor 102, system memory 103, and durable storage 104) of computer system 101, and operating system 110b executing on top of the hypervisor 110a. In other embodiments, however, the operating environment 110 comprises an operating system 110b executing directly on the hardware (e.g., processor 102, system memory 103, and durable storage 104) of computer system 101.

In embodiments, the operating environment 110 and the control logic 109 cooperate to record a replayable execution trace 112 (or a plurality of replayable execution traces) of code execution at the processor 102. In embodiments, tracing techniques utilized by the operating environment 110 and control logic 109 to record a replayable execution trace 112 are based at least on the processor 102 recording influxes to at least a portion of the memory cache 107 during code execution. In embodiments, each replayable execution trace 112 comprises a "bit-accurate" record of execution of a corresponding context (e.g., process, operating system, virtual machine, enclave, hypervisor, etc.) as that context executed at the processor 102. In some embodiments, a replayable execution trace is a "bit accurate" record of that context's execution activity. This bit-accurate record enables machine code instructions that were previously executed as part of the context at the processing unit 106 to be replayed later, such that, during replay, these machine code instructions are re-executed in the same order and consume the same data that they did during trace recording. While a variety of bit-accurate tracing approaches are possible, as mentioned, the embodiments herein record a bit-accurate execution trace based on logging at least some of the influxes to memory cache 107 during execution of a traced context (e.g., process, virtual machine, etc.). By logging at least some of these influxes during execution of the context, a replayable execution trace 112 of that context captures at least some of the memory reads that were performed by the machine code instructions that executed as part of the context.

The cache-based tracing techniques used by the embodiments herein are built upon an observation that the processor 102 (including its the memory cache 107) forms a semi- or quasi-closed system. For example, once portions of data for an executing context (i.e., machine code instructions and runtime data) are loaded into memory cache 107, processing unit 106 can continue executing that context—without any other external input—as a semi- or quasi-closed system for bursts of time. In particular, once the memory cache 107 is loaded with machine code instructions and runtime data, the execution units 106b can load and execute those machine code instructions from the memory cache 107, using runtime data stored in the memory cache 107 as input to those machine code instructions, and using the registers 106a. So long as the data (i.e., machine code instructions and runtime data) that are needed for the processor 102 to execute that thread exists within the memory cache 107, the processor 102 can continue executing that context without further external input.

When the processing unit 106 needs some influx of data (e.g., because a machine code instruction it is executing, will execute, or may execute accesses code or runtime data not already in the memory cache 107), the processor 102 may carry out a "cache miss," importing data into the memory cache 107 from the system memory 103. As part of this process, the processor 102 may also refer to a PTE stored in the TLB 108, or perform a page walk of one or more memory page tables stored in system memory 103 and influx a PTE into the TLB 108. In an example, if a data cache miss occurs when a processing unit 106 executes a machine code instruction that performs a memory operation on a memory address within the operating environment runtime 110' storing runtime data, the processor 102 imports runtime data from that memory address in the system memory 103 to one of the cache lines of the data portion of the memory cache 107. Similarly, if a code cache miss occurs when a processing unit 106 tries to fetch a machine code instruction from a memory address within the operating environment runtime 110' storing code, the processor 102 imports code from that memory address in system memory 103 to one of the cache lines of the code portion of the memory cache 107. The processing unit 106 then continues execution using the newly imported data, until new data is needed.

In embodiments, processor 102 is enabled to record a bit-accurate representation of execution of a context executing at the processor 102, by recording, into at least one trace data stream corresponding to the context, sufficient data to be able to reproduce at least a subset of influxes of information into the memory cache 107 and the TLB 108 as processing unit 106 executes that context's code. For example, some approaches to recording these influxes operate on a per-processing-unit basis. These approaches involve recording, for each processing unit that is being traced, at least a subset of cache misses within the memory cache 107, and at least a subset of PTE misses within the TLB 108, along with a time during execution at which each piece of data was brought into the memory cache 107 or the TLB 108 (e.g., using a count of instructions executed or some other counter). In some embodiments, these approaches involve also recording, for each processing unit that is being traced, any uncached reads (i.e., reads from hardware components and un-cacheable memory that bypass the memory cache 107) caused by that processing unit's activity, as well as the side-effects of having executed any non-deterministic processor instructions (e.g., one or more values of registers 106a after having executed a non-deterministic processor instruction).

Figure 4:
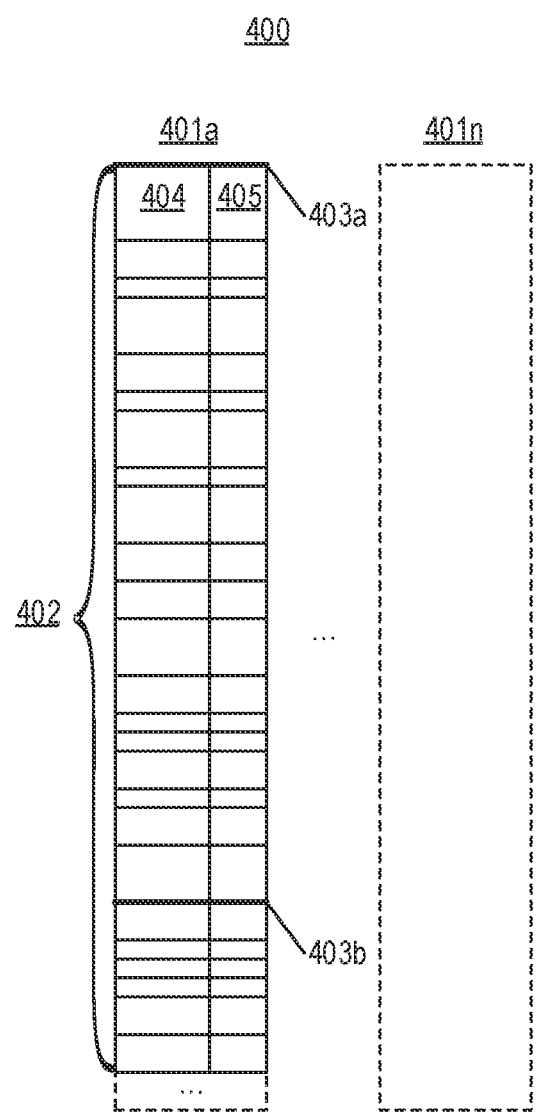
FIG. 4 illustrates an example of an execution trace.

FIG. 4 illustrates an example of an execution trace (e.g., replayable execution trace 112). In particular, FIG. 4 illustrates an execution trace 400 that includes a plurality of data streams 401 (i.e., data streams 401a-401n). In embodiments, each of data streams 401 represents execution of a different context, such as a different thread that executed from the code of operating environment 110 or application 111. In an example, data stream 401a records execution of a first thread of application 111, while data stream 401n records an $n^{th}$ thread of application 111. As shown, data stream 401a comprises a plurality of data packets 402. Since the particular data logged in each of data packets 402 can vary, these data packets are shown as having varying sizes. In embodiments, when using time-travel debugging technologies, one or more of data packets 402 records the inputs (e.g., register values, memory values, etc.) to one or more executable instructions that executed as part of this first thread of application 111. In embodiments, memory values are obtained as influxes to memory cache 107 and/or as uncached reads. In embodiments, data stream 401a also includes one or more key frames 403 (e.g., key frames 403a and 403b), each capturing sufficient information (e.g., such as a snapshot of register and/or memory values) to enable the prior execution of the thread to be replayed—starting at the point of the key frame and proceeding forward.

In embodiments, an execution trace also includes the actual code that was executed. Thus, in FIG. 4, each of data packets 402 is shown as including a data inputs portion 404 (non-shaded) and a code portion 405 (shaded). In embodiments, the code portion 405 of each of data packets 402, if present, includes the executable instructions that executed based on the corresponding data inputs. In other embodiments, however, an execution trace omits the actual code that was executed, instead relying on having separate access to the executable code (e.g., a copy of application 111). In these other embodiments, each data packet specifies an address or offset to an appropriate executable instruction in an application binary image. Although not shown, it is possible that the execution trace 400 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., data stream 401a) writes to a synchronization variable, a first sequencing event is recorded into that data stream (e.g., data stream 401a). Later, if a second thread that is traced into a second data stream (e.g., data stream 401b) reads from that synchronization variable, a second sequencing event is recorded into that data stream (e.g., data stream 401b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

Some bit-accurate tracing approaches leverage extensions to memory cache 107 that track whether the value of a given cache line can be considered to have been captured by a replayable execution trace 112 on behalf of processing unit 106. In various implementations, these cache modifications extend the slots (e.g., slots 303) in at least one level of the memory cache 107 to include additional "logging" (or "tracking") bits (e.g., using one of additional portions 302c), or reserve one or more slots for logging bit use. These logging bits enable the control logic 109 to identify, for each cache line, a processing unit 106 (or a plurality of processing units) that consumed/logged the cache line. Use of logging bits can enable the control logic 109 to avoid re-logging cache line influxes for one execution context after a processing unit transitions to another execution context (e.g., another thread, another virtual machine, kernel mode, etc.) if that other context did not modify the cache line. Additionally, use of logging bits can enable a trace entry for one context to reference data already logged on behalf of another context. In various embodiments, for each cache line, one or more logging bits are used as (i) a single flag that indicates whether or not the cache line has been logged on behalf of any processing unit, (ii) a plurality of flags that each indicate whether or not the cache line has been logged on behalf of a corresponding processing unit, or (iii) an index which indicates a particular processing unit from among a plurality of processing units for which the cache line has been logged (or which indicates that the cache line has not been logged on behalf of any processing unit using some non-index value).

Additional, or alternative, bit-accurate tracing approaches utilize associative memory caches, coupled with memory cache way-locking features to "lock" one or more subsets of a memory cache to an entity that is being traced, and then log based on identifying cache misses into locked subset(s) of the memory cache. In particular, these approaches utilize way-locking to lock one or more cache "ways" for an entity that is being traced, such that those way(s) are reserved for that entity. Then, when fulfilling cache misses relating to execution of that entity, those cache misses are stored in cache slots corresponding to those locked/reserved ways. The control logic 109 then makes logging decisions based on which ways cache misses are stored to, e.g., by logging all cache misses into way(s) that are locked/reserved for a traced entity.

Additional, or alternative, bit-accurate tracing approaches use memory markings as logging cues. More particularly, in embodiments, the operating environment 110 and the control logic 109 cooperate to record a replayable execution trace 112 based on categorizing different memory regions, such as physical memory pages in system memory 103, as logged (i.e., to be logged when consumed) or not logged (i.e., not to be logged when consumed). In embodiments, an execution context corresponds to at least one of a process executing on top of operating system 110b, operating system 110b itself, a virtual machine/memory partition created by hypervisor 110a, an enclave, a nested hypervisor, and the like. In embodiments, using memory markings as logging cues for processor-based execution tracing is based at least on (i) the operating environment 110 maintaining a data structure (e.g., data structure 113) that categorizes different memory regions as being logged and not logged, and (ii) the control logic 109 using this data structure to make logging decisions during tracing. For example, using the categorizations stored in data structure 113, if a processing unit 106 executing a logged context consumes a cache line corresponding to a memory region categorized/marked as logged, then the control logic 109 logs this consumption into the replayable execution trace 112; conversely, if a processing unit 106 executing a logged context consumes a cache line corresponding to a memory region categorized/marked as not logged, then the control logic 109 refrains from logging this consumption into the replayable execution trace 112. In embodiments, memory markings are stored as part of PTEs within memory page tables, and those markings are therefore readily accessible to the processing unit 106 as part of cached PTEs within the TLB 108.

Additional, or alternative, bit-accurate tracing approaches reduce the size of replayable execution traces by performing cache-based trace logging using tags in a higher memory level (e.g., an upper-level cache, or system memory 103). These upper-level cache tagging approaches operate to log influxes to a first cache level, but leverage tags within an upper second cache level (or even within system memory 103) to track whether a value of a given cache line influx has already been captured by a replayable execution trace 112. In particular, during an influx of a cache line to the first cache level, embodiments consult a tag in the second cache level (or system memory 103) to determine if a current value of the cache line can be reconstructed from prior trace logging, such as trace logging performed in connection with a prior influx of the cache line to the first cache level. If so, embodiments refrain from capturing a current value of the cache line into the replayable execution trace 112 when the cache line is influxed to the first cache level. Additionally, during evictions from the first cache level, embodiments determine whether the cache line being evicted is in a "logged state" within the first cache level (i.e., a current value of the cache line can be obtained from a prior-recorded trace, and/or can be constructed by replaying the prior-recorded trace) and sets a tag in the second cache level (e.g., a tag stored in one of additional portions 302c) as appropriate to indicate whether or not the cache line that is being evicted is logged.

Regardless of which tracking technique (or techniques) are used, in embodiments the control logic 109 logs based on influxes at a particular level in a multi-level memory cache (i.e., a recording" or "logging" cache level). For example, in embodiments the control logic 109 logs influxes at an L2 memory cache level, even if one or more higher cache levels are present. Thus, in this example, the L2 memory cache level is referred to as a recording cache level.

Some embodiments herein operate to log cache line lifetime hints when recording an execution trace (e.g., replayable execution trace 112). In embodiments, these logged cache line lifetime hints enable the identification of a time-window (and even multiple discontinuous time-windows) during which a logged value of a cache line is valid from a trace replay perspective. Based on identified cache events, embodiments log cache line lifetime hints that are at least sufficient to identify a time-window (and even multiple discontinuous time-windows) during which a cache line value captured by a replayable execution trace 112 (i.e., stored in the replayable execution trace 112, or re-constructible from replay of the replayable execution trace 112) is guaranteed be the value that the memory cache 107 stored during corresponding time-window(s) of execution time during trace recording. Some additional embodiments log cache line lifetime hints that are additionally sufficient to expand at least one of these time-window(s) to also include at least one period of execution time during which the logged value of a cache line can also be trusted for replay purposes (at least with a relatively high degree of certainty), even if that value does not necessarily match the value that the memory cache 107 stored during corresponding time-window(s) of execution time during trace recording. In these additional embodiments, the logged cache line lifetime hints record at least one of (i) a first moment that the logged cache line value is valid for replay purposes, or (ii) a last moment that the logged cache line value is valid for replay purposes.

Figure 5:
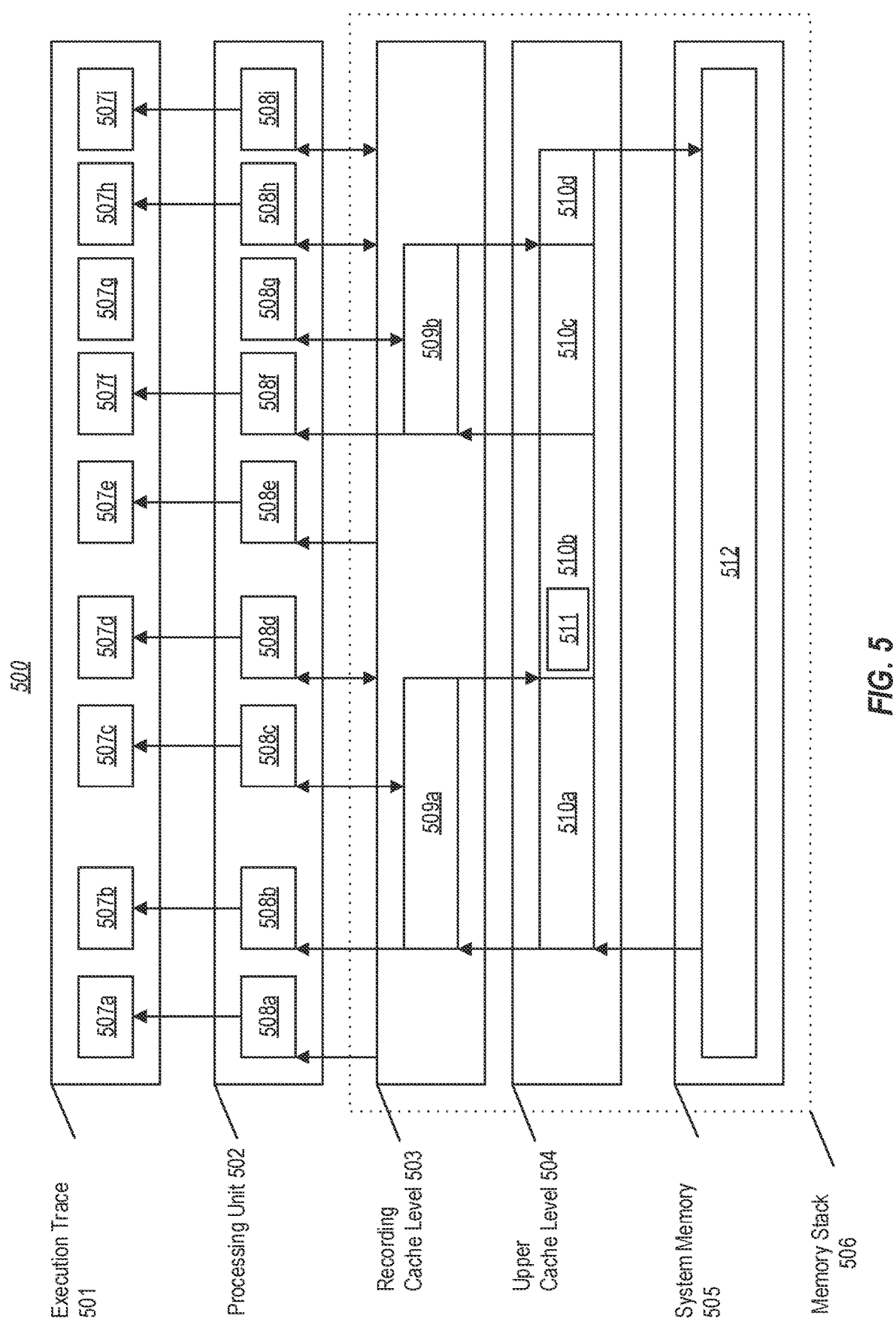
FIG. 5 illustrates an example of identifying and recording cache line lifetime hints.

To demonstrate these concepts, FIG. 5 illustrates an example 500 of identifying and recording cache line lifetime hints. In particular, FIG. 5 illustrates a plurally of timelines corresponding to an execution trace 501 (e.g., replayable execution trace 112), a processing unit (e.g., processing unit 106) and a memory stack 506. In FIG. 5, the memory stack 506 is shown as comprising a recording cache level 503 (e.g., an L2 cache in memory cache 107) that includes cache entry 509, an upper cache level 504 (e.g., an L3 cache in memory cache 107) that includes cache entry 510, and a system memory 505 (e.g., system memory 103) that includes memory data 512. In FIG. 5, the execution trace 501 comprises trace entries 507 (i.e., trace entry 507a to trace entry 507i); correspondingly, the processing unit 502 comprises execution events 508 (i.e., execution event 508a to execution event 508i). The memory stack 506 shows movement of cache line data throughout the recording cache level 503, the upper cache level 504 and the system memory 505. In FIG. 5, the trace entries 507 comprise cache line lifetime hints that enable the identification of a time-window (and even multiple discontinuous time-windows) during which a logged value of a cache line is valid from a trace replay perspective.

In FIG. 5, execution event 508a represents a request for the memory data 512 by processing unit 502, and trace entry 507a represents a logged cache line lifetime hint for execution event 508a. Based on execution event 508a, a cache entry 510 in the upper cache level 504 stores a cache line influx corresponding to memory data 512, and cache entry 509 in the recording cache level 503 stores a cache line influx corresponding to cache entry 510. Execution event 508b represents an initial consumption of cache entry 509 by processing unit 502, and trace entry 507b represents a logged cache line lifetime hint for execution event 508b. Execution event 508c represents a last consumption (e.g., load or store) of cache entry 509 by processing unit 502 prior to the cache line's eviction, and trace entry 507c represents a logged cache line lifetime hint for execution event 508c. Execution event 508d represents an event causing an eviction of the cache line from the recording cache level 503 to the upper cache level 504, and trace entry 507d represents a logged cache line lifetime hint for execution event 508d. Cache entry portion 509a represents a first lifetime of the cache line stored in cache entry 509 in the recording cache level 503, cache entry portion 510a represents a first lifetime of the cache line stored in cache entry 510 in the upper cache level 504, and cache entry portion 510b represents a second (post-eviction) lifetime of the cache line stored in cache entry 510 in the upper cache level 504.

Execution event 508e represents a subsequent request for the memory data 512 by processing unit 502, and trace entry 507e represents a logged cache line lifetime hint for execution event 508a. Based on execution event 508e, the cache entry 509 in the recording cache level 503 stores a cache line influx corresponding to cache entry 510. Execution event 508f represents an initial consumption of cache entry 509 by processing unit 502 after the subsequent request, and trace entry 507f represents a logged cache line lifetime hint for execution event 508f. Execution event 508g represents a last consumption (e.g., load or store) of cache entry 509 by processing unit 502 prior to the cache line's eviction, and trace entry 507g represents a logged cache line lifetime hint for execution event 508g. Execution event 508h represents an event causing an eviction of cache entry 509 from the recording cache level 503 to the upper cache level 504, and trace entry 507h represents a logged cache line lifetime hint for execution event 508h. Execution event 508i represents an event causing an eviction of cache entry 510 from the upper cache level 504 to the system memory 505, and trace entry 507i represents a logged cache line lifetime hint for execution event 508i. Cache entry portion 509b represents a second lifetime of the cache line stored in cache entry 509 in the recording cache level 503, cache entry portion 510c represents a third lifetime of the cache line stored in cache entry 510 in the upper cache level 504, and cache entry portion 510d represents a fourth lifetime of the cache line stored in cache entry 510 in the upper cache level 504.

In embodiments, trace entry 507b (i.e., an initial cache influx and/or consumption) and trace entry 507c (i.e., a last consumption) are usable to identify a first time-window during which the value of cache entry 509 captured by execution trace 501 is guaranteed to be the value that the recording cache level 503 stored during trace recording. Similarly, in embodiments trace entry 507f (i.e., an initial cache influx and/or consumption) and trace entry 507g (i.e., a last consumption) are usable to identify a second time-window during which the value of cache entry 509 captured by execution trace 501 is guaranteed be the value that the recording cache level 503 stored during trace recording.

Some embodiments can extend these time-windows to include one or more time periods during which the logged value of a cache line can also be trusted for replay purposes, because the logged value is the correct value that will eventually be in hardware and can be legally be "seen" during trace replay from a causality perspective based on cache and memory ordering rules, even if that value does not yet match the value stored in hardware during trace recording. For example, trace entry 507a can be used to extend a beginning of the first time-window to the moment of execution event 508a (i.e., a request for memory data), so long as CCP data indicates that the cache line eventually stored in cache entry 509 is not modified by another processing unit between the time of execution event 508a and execution event 508b. Additionally, trace entry 507d can be used to extend an ending of the first time-window to the moment of execution event 508d (i.e., an eviction from the recording cache level 503). Similarly, trace entry 507e can be used to extend a beginning of the second time-window to the moment of execution event 508e (i.e., a request for memory data), so long as CCP data indicates that the cache line eventually stored in cache entry 509 is not modified by another processing unit between the time of execution event 508e and execution event 508f. Additionally, trace entry 507h can be used to extend an ending of the second time-window to the moment of execution event 508h (i.e., an eviction from the recording cache level).

While a few examples of cache line lifetime time-windows have been provided in the brief introduction above, it will be appreciated that many legal time-windows are possible in example 500. For example, as will be appreciated in view of the foregoing, trace entry 507a is a valid marker to start a lifetime it can be attested that there was no modification to the value of the cache line between trace entry 507a and trace entry 507b. Additionally, trace entry 507b is a valid start marker, trace entry 507c is a valid end marker, trace entry 507d is a valid end marker, and trace entry 507i is also a valid end marker. With this foundation, the following are examples of legal beginning and ending trace entry pairings (and corresponding time-windows): trace entry 507a to trace entry 507c; trace entry 507a to trace entry 507d; trace entry 507a to trace entry 507i; trace entry 507b to trace entry 507c; trace entry 507b to trace entry 507d; trace entry 507b to trace entry 507i; trace entry 507e to trace entry 507g; trace entry 507e to trace entry 507h; trace entry 507f to trace entry 507g; trace entry 507f to trace entry 507h; trace entry 507a to trace entry 507i; trace entry 507b to trace entry 507i; trace entry 507e to trace entry 507i; and trace entry 507f to trace entry 507i.

In embodiments, the recording cache level 503 comprises logging bit(s) that enable the control logic 109 to identify, for each cache line, a processing unit 106 (or a plurality of processing units) that consumed/logged the cache line. In these embodiments, the control logic 109 sets logging bit(s) for cache entry 509 to indicate that a cache line stored in cache entry 509 has been logged on behalf of one or more logged entities and clears the logging bit(s) when that cache line can no longer be considered to be logged. In embodiments, the control logic 109 set the logging bit(s) when logging a cache line, and thus a trace entry corresponding to this logging inherently signals a beginning of the cache line's lifetime from a tracing perspective. In embodiments, upon clearing the logging bit(s) (e.g., due to a write to the cache line by a non-logged entity, due to a cache line invalidation, etc.), the control logic 109 logs a cache line lifetime hint indicating that the bit was cleared, which signals an ending of the cache line's lifetime. In embodiments, any time a cache line that is evicted has its logging bit(s) set, the control logic 109 logs a cache line lifetime hint (e.g., trace entry 507d, trace entry 507h) indicating the eviction, which also signals an ending of the cache line's lifetime.

In embodiments, the recording cache level 503 is part of a set-associative cache, and the control logic 109 utilizes way locking to track logged cache entries. In embodiments, when there is an influx of a cache line into a logged way of the recording cache level 503, the control logic 109 logs a cache line lifetime hint (e.g., trace entry 507b, trace entry 507f) indicating a way into which the cache line was influxed. Notably, as will be understood by one of ordinary skill in the art, when using set-associative caches, the memory address associated with a cache line determines a particular set to which the cache line will be assigned. By logging the way as a cache line lifetime hint, this hint enables identification of a particular slot within the cache, thus enabling a determination of when a particular cache entry can be associated with a cache line's lifetime. In embodiments, any time a cache line within a logging way is evicted from the recording cache level 503, the control logic 109 logs a cache line lifetime hint (e.g., trace entry 507d, trace entry 507h) indicating the eviction, which also signals an ending of the cache line's lifetime.

In embodiments, the control logic 109 utilizes memory markings as logging cues. In these embodiments, and when the recording cache level 503 is also part of a set-associative cache, when there is an influx of a cache line into a logged way of the recording cache level 503, the control logic 109 logs a cache line lifetime hint (e.g., trace entry 507b, trace entry 507f) indicating a way into which the cache line was influxed. In embodiments, when there is an eviction of a cache line, the control logic 109 performs a lookup in the TLB 108 to determine if the cache line corresponded to a logged or non-logged memory region (e.g., memory page), and logs a cache line lifetime hint (e.g., trace entry 507d, trace entry 507h) indicating the eviction, which also signals an ending of the cache line's lifetime.

Notably, it is possible that a cache line exists in the recording cache level 503, but there is no corresponding live TLB entry for that cache line (i.e., because the appropriate TLB entry was already evicted). In some embodiments, the control logic 109 accounts for this situation by also logging cache line lifetime hints that indicate when logged TLB entries are evicted from the TLB 108. Using these hints, in embodiments any cache line(s) in the memory cache 107 can be considered to have an active lifetime only when a corresponding TLB entry is known to have been live within the TLB 108. In embodiments, if a TLB entry is evicted but is later influxed back into the TLB without a corresponding cache line having been evicted from the memory cache 107, then that cache line can be considered to have an active lifetime even over the gap during which there was no corresponding life TLB entry. In other embodiments, the control logic 109 updates a cache line-specific flag (e.g., a logging bit associated with a cache slot, a cache line tag, a bit within a data structure in system memory 103, etc.) to indicate whether or not the cache line's corresponding memory page is logged.

Some embodiments utilize tags in a higher memory level (e.g., an upper-level cache, or system memory 103) to bridge/merge discontinuous time-windows. For example, in FIG. 5, there is a tag 511 associated with cache entry portion 510b. In embodiments, this tag 511 indicates that the line of cache data stored by cache entry portion 510b was logged while in the recording cache level 503. In embodiments, when the control logic 109 logs trace entry 507f, the control logic 109 uses this tag 511 to record a cache line lifetime hint indicating that a value of cache line did not change from the time it was evicted at execution event 508d to the time it was influxed at execution event 508f. With this hint, it is possible to merge the first time-window and the second time-window discussed above, to create for example, a time-window extending from execution event 508a to execution event 508h. In embodiments, the control logic 109 records a cache line lifetime hint if the tag 511 is cleared, which means that the tag 511 cannot be used to bridge time-windows (i.e., since the value of cache line cannot be guaranteed to have not changed from the time it was evicted at execution event 508d to the time it was influxed at execution event 508f). Some embodiments may even record cache line lifetime hints (e.g., trace entry 507i) indicating an eviction from the upper cache level 504, enabling the end of the time-window to be extended even further to that eviction (e.g., the arrow from cache entry portion 510c to memory data 512). Some embodiments record the end lifetime event when the tag 511 in the upper cache level 504 is cleared, or when the cache line is evicted from upper cache level 504, instead of when the cache line is evicted from the recording cache level 503 into the upper cache level 504. In embodiments, if the eviction from the recording cache level 503 doesn't go into an entry where tagging allows the control logic 109 to track that the data hasn't changed, then the eviction is logged at that time.

Figure 1B:
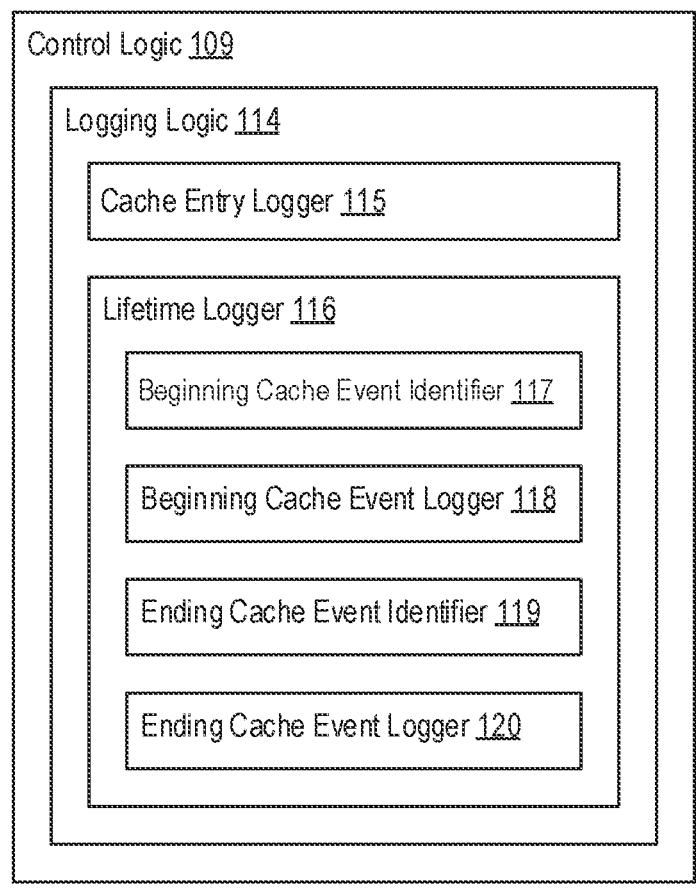
FIG. 1B illustrates an example of processor control logic that logs cache line lifetime hints when recording an execution trace.

FIG. 1B illustrates additional detail of control logic 109, including components that operate to log cache line lifetime hints when recording an execution trace. The depicted components of control logic 109, together with any sub-components, represent various functions that the control logic 109 might implement or utilize in accordance with various embodiments described herein. It will be appreciated, however, that the depicted components—including their identity, sub-components, and arrangement—are presented merely as an aid in describing various embodiments of the control logic 109 described herein, and that these components are non-limiting to how software and/or hardware might implement various embodiments of the control logic 109 described herein, or of the particular functionality thereof.

As shown, the control logic comprises logging logic 114 which, in turn, includes a cache entry logger 115. In general, the cache entry logger 115 takes any appropriate action to determine when to initiate logging of a given cache line into a replayable execution trace 112 and/or update tracking information for that cache line. Depending on the bit-accurate tracing approach (or approaches) being used, in various embodiments the cache entry logger 115 reads and/or sets one or more logging bits associated with a given cache line, determines whether or not a given cache line was influxed into a logging way, determines if a given cache line corresponds to a memory page that is tagged for logging, reads and/or updates an upper-level tag associated with a given cache line, etc. When appropriate, the cache entry logger 115 initiates logging of cache entries stored within the slots of the memory cache 107 into the replayable execution trace 112, such as by recording a cache line address (e.g., address portion 302a) and corresponding cache line data (e.g., cache line portion 302b) or a reference thereto.

The logging logic 114 also includes a lifetime logger 116. In general, the lifetime logger 116 records additional data (i.e., cache line lifetime hints) into the replayable execution trace 112 that are usable to later identify one or more lifetimes of one or more cache lines that were recorded by the cache entry logger 115. The lifetime logger 116 is shown as comprising a beginning cache event identifier 117 and a beginning cache event logger 118. In general, during trace recording, the beginning cache event identifier 117 identifies the occurrence of an event related to the memory cache 107 that is usable to identify the beginning of the lifetime of a particular cache line within the memory cache 107. In various examples, a beginning cache event comprises an influx of the cache line to, or within, the memory cache (e.g., from system memory 103 to the memory cache 107, from an upper cache level to a lower recording cache level, etc.), a consumption of the cache line by the processing unit 106, a request for the cache line by the processing unit 106, and the like. Correspondingly, the beginning cache event logger 118 initiates logging of this beginning cache event into the replayable execution trace 112. In various examples, initiating logging of this beginning cache event comprises initiating logging of an indication that the cache line was consumed (e.g., based on indicating that a logging bit associated with the cache line was set by the cache entry logger 115, based on indicating an instruction that consumed the cache line, etc.), initiating logging of an indication of a slot to which the cache line was influxed (e.g., based on identifying a way into which the cache line was influxed), initiating logging of an indication that the cache line was requested (e.g., based on an indication of an instruction that requested the cache line), and the like.

The lifetime logger 116 is also shown as comprising an ending cache event identifier 119, and an ending cache event logger 120. In general, during trace recording, the ending cache event identifier 119 identifies the occurrence of an event related to the memory cache 107 that is usable to identify the ending of the lifetime of a particular cache line within the memory cache 107. In various examples, an ending cache event comprises a consumption of the cache line by the processing unit 106, an eviction of the cache line (e.g., from a recording cache level, or from a cache level backing the recording cache level), an invalidation of the cache line (e.g., within a recording cache level), a clearing of an upper-level tag associated with the cache line (e.g., a tag within a cache level backing a recording cache level), and the like. Correspondingly, the ending cache event logger 120 initiates logging of this ending cache event into the replayable execution trace 112. In various examples, initiating logging of this ending cache event comprises initiating logging of an indication an indication that the cache line was consumed (e.g., based on indicating an instruction that consumed the cache line), initiating logging of an indication of an eviction of the cache line (e.g., from a recording way, from a recording cache level, or from a cache level backing the recording cache level), initiating logging of an invalidation of the cache line, initiating logging of an indication of a clearing of an upper-level tag associated with the cache line, and the like.

In order to further describe operation of these components of control logic 109, the following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 6:
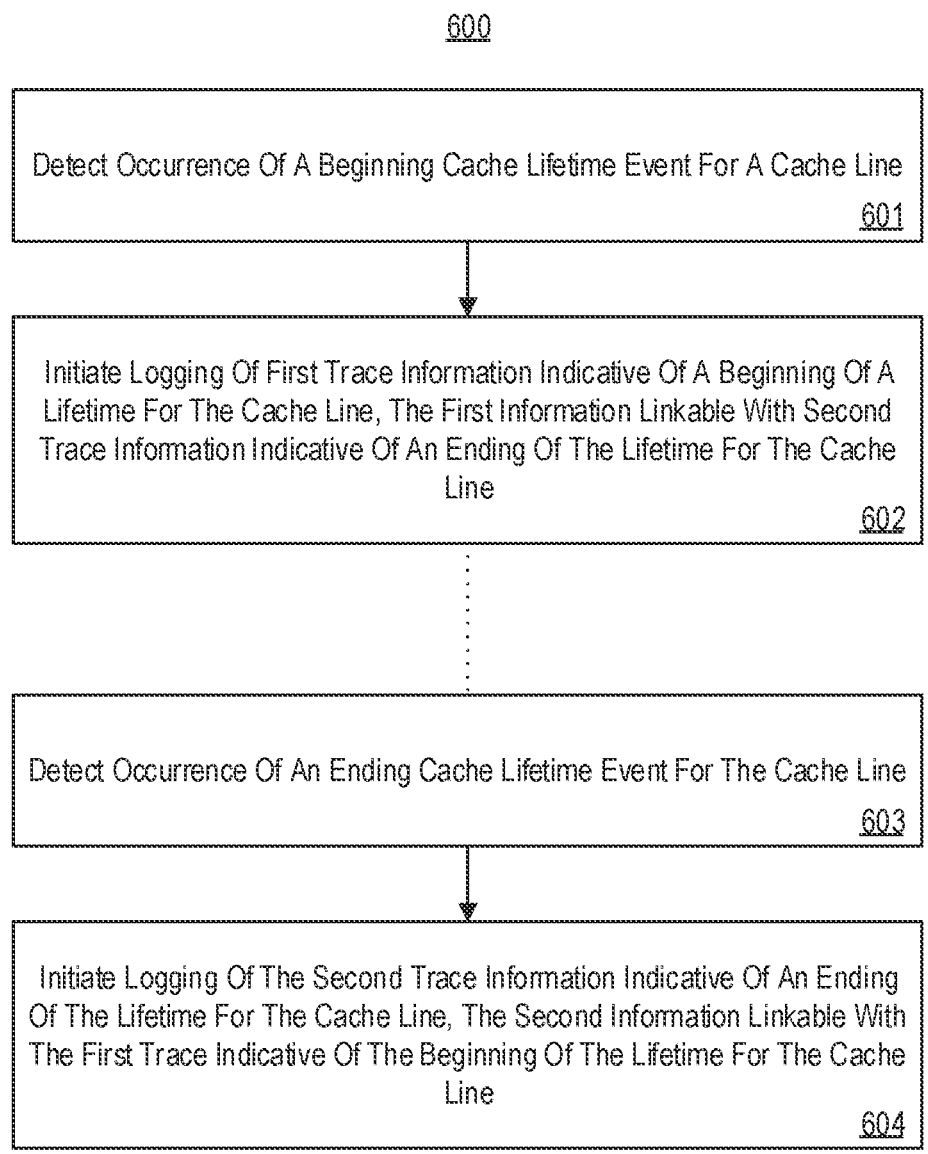
FIG. 6 illustrates a flow chart of an example method for logging cache line lifetime hints when recording an execution trace.

FIG. 6 illustrates a flow chart of an example method 600 for logging cache line lifetime hints when recording an execution trace. Method 600 will be described with respect to the components and data of computing environment 100. In embodiments, method 600 is implemented based on control logic (e.g., control logic 109) of a microprocessor (e.g., processor 102) that comprises a processing unit (e.g., processing unit 106) and a memory cache (e.g., memory cache 107).

Method 600 comprises an act 601 of detecting occurrence of a beginning cache lifetime event for a cache line. In embodiments, act 601 comprises, based on executing a first instruction at the processing unit, detecting occurrence of a first cache event that initiates a lifetime of a cache line within the memory cache. In embodiments, act 601 has a technical effect of enabling the processor 102 to detect a beginning lifetime of a cache line during trace recording. In an example of act 601, based on execution of an instruction by processing unit 106 (e.g., one of execution event 508a, execution event 508b, execution event 508e, or execution event 508f of example 500), the beginning cache event identifier 117 identifies a beginning cache event, which is usable to signify a beginning of a lifetime of a cache line stored within the memory cache 107 (or at least a cache line that is requested to be influxed into a recording cache level of the memory cache 107). In embodiments, a type of the first/beginning cache event varies, and particularly in view of the bit-accurate tracing technique (or techniques) being employed by the cache entry logger 115.

In one example, the cache entry logger 115 utilizes way locking. In some embodiments, when the cache entry logger 115 utilizes way locking, the beginning cache event identifier 117 identifies a first cache event (e.g., based on occurrence of execution event 508b or execution event 508f) comprising an influx to a logging way (i.e., a way within a recording cache level, and that is locked to a recorded entity). Thus, in some embodiments of act 601, the first cache event comprises an influx of the cache line into a recording way within the memory cache. Notably some embodiments combine way locking with utilizing memory markings as logging cues, and in those embodiments the first cache event also comprises an influx of the cache line into a recording way within the memory cache. In embodiments, identifying a first cache event comprising an influx of a cache line into a recording way within a memory cache has a technical effect of identifying a beginning of a cache line lifetime based on when the cache line was influxed into a recording cache level.

In another example, the cache entry logger 115 utilizes logging bits within at least a recording cache level of the memory cache 107. In some embodiments, when the cache entry logger 115 utilizes logging bits, the beginning cache event identifier 117 identifies a first cache event (e.g., based on occurrence of execution event 508b or execution event 508f) comprising at least one of an influx of the cache line to a recording cache level, or a consumption of the cache line by the processing unit. Thus, in some embodiments of act 601, the first cache event comprises an influx of the cache line within the memory cache. In embodiments, identifying a first cache event comprising an influx of a cache line has a technical effect of identifying a beginning of a cache line lifetime based on when the cache line was influxed into a recording cache level. In other embodiments of act 601, first cache event comprises a consumption of the cache line by the processing unit. In embodiments, identifying a first cache event comprising a consumption of a cache line has a technical effect of identifying a beginning of a cache line lifetime based on when the cache line was consumed. In embodiments, the cache entry logger 115 sets a logging bit associated with the cache line in connection with at least one of the influx or consumption, thereby indicating that the cache line has been logged by the cache entry logger 115 into the replayable execution trace 112.

Based at least on the occurrence of act 601, method 600 also comprises an act 602 of initiating logging of first trace information indicative of a beginning of a lifetime for the cache line, the first information linkable with second trace information indicative of an ending of the lifetime for the cache line. In embodiments, act 602 comprises, based on detecting the first cache event, initiating logging, into the execution trace, first trace information indicating a beginning of the lifetime of the cache line within the memory cache. In embodiments, act 602 has a technical effect of enabling the processor 102 to record information indicative of the beginning lifetime of the cache line during trace recording. In an example of act 602, based on identification of the beginning cache event in act 601, the beginning cache event logger 118 logs into replayable execution trace 112 information (e.g., one of trace entry 507a, trace entry 507b, trace entry 507e, or trace entry 507f of example 500) that is usable to identify when (i.e., in terms of execution time) the first cache event occurred during recording of replayable execution trace 112. This information is usable to identify a beginning of at least one time-window that begins a lifetime of the lifetime for the cache line discussed in connection with act 601. In embodiments, a type of the first trace information varies, and particularly in view of the bit-accurate tracing technique (or techniques) being employed by the cache entry logger 115.

In one example, the cache entry logger 115 utilizes way locking. In some embodiments, when the cache entry logger 115 utilizes way locking, the beginning cache event logger 118 initiates logging of a particular way into which the cache line was influxed. Thus, in some embodiments of act 602, the first trace information comprises an identification of the recording way. As discussed, when using set-associative caches, the memory address associated with a cache line determines a particular set to which the cache line will be assigned. Thus, in embodiments, initiating logging of first trace information comprising an identification of the recording way has a technical effect of enabling identification of a particular slot within the cache and, by extension, a determination of when a particular slot within the memory cache 107 can be associated with a beginning of a cache line's lifetime.

In another example, the cache entry logger 115 utilizes logging bits within at least a recording cache level of the memory cache 107. As mentioned, in embodiments the cache entry logger 115 sets a logging bit associated with the cache line in connection with at least one of the influx or consumption, thereby indicating that the cache line has been logged by the cache entry logger 115 into the replayable execution trace 112. In some embodiments, when the cache entry logger 115 utilizes logging bits, the beginning cache event logger 118 initiates logging of an indication when a logging bit is set. Thus, in some embodiments of act 602, the first trace information comprises an indication that a logging bit associated with the cache line was set. In embodiments, initiating logging of first trace information comprising an indication that a logging bit associated with the cache line was set has a technical effect of enabling a determination of when a particular slot within the memory cache 107 can be associated with a beginning of a cache line's lifetime.

Some embodiments can extend time-windows to include time periods during which the logged value of a cache line can also be trusted for replay purposes, even if that value does not necessarily match the value stored in hardware. As mentioned, some embodiments extend a beginning of a time-window to the moment of a request for memory data, so long as CCP data indicates that a cache line that is eventually influxed to satisfy that request is not modified by another processing unit between the time of the request and the time of the influx. Thus, in some embodiments of act 602, the first trace information comprises an indication that execution of the first instruction at the processing unit caused a request for the cache line and, prior to initiating logging of the first trace information, the microprocessor ensures that the cache line is not modified by another processing unit after the request for the cache line and before an influx of the cache line. In embodiments, this has a technical effect of enabling a determination that the beginning of a cache line's lifetime can be extend to the time of the request.

Sometime after act 602, method 600 also comprises an act 603 of detecting occurrence of an ending cache lifetime event for the cache line. In embodiments, act 603 comprises, subsequent to initiating logging of the first trace information, and based on executing a second instruction at the processing unit, detecting occurrence of a second cache event that ends the lifetime of the cache line within the memory cache. In embodiments, act 603 has a technical effect of enabling the processor 102 to detect an ending lifetime of a cache line during trace recording. In an example of act 603, sometime after act 602, and based on execution of a subsequent instruction by processing unit 106 (e.g., one of execution event 508c, execution event 508d, execution event 508g, or execution event 508h of example 500), the ending cache event identifier 119 identifies an ending cache event, which is usable to signify an ending of the lifetime of the cache line first discussed in connection with act 601. In embodiments, a type of the second/ending cache event varies, and particularly in view of the bit-accurate tracing technique (or techniques) being employed by the cache entry logger 115.

In one example, the second cache event comprises the latest consumption of the cache line (e.g., execution event 508c or execution event 508g) prior to its eviction. Thus, in some embodiments of act 603, the second cache event comprises a consumption of the cache line by the processing unit. In embodiments, identifying a second cache event comprising a consumption of the cache line by the processing unit has a technical effect of identifying an ending of a cache line lifetime based on when the cache line was last consumed by a traced entity.

In another example, the cache entry logger 115 utilizes way locking. In some embodiments, when the cache entry logger 115 utilizes way locking, the ending cache event identifier 119 identifies a second cache event (e.g., based on occurrence of execution event 508d or execution event 508h) comprising an eviction from a logging way (or from a recording cache level, which inherently implies eviction from a logging way). As used herein, and in the claims, the term "eviction" should be broadly interpreted to include any removal, replacement, or invalidation of a cache entry. Thus, in some embodiments of act 603, the second cache event comprises an eviction of the cache line (e.g., from a recording cache level, or from a recording way, etc.). In embodiments, identifying a second cache event comprising an eviction of the cache line has a technical effect of identifying an ending of a cache line lifetime based on when the cache line was evicted from the recording cache level.

In another example, the cache entry logger 115 utilizes logging bits within at least a recording cache level of the memory cache 107. In embodiments, the cache entry logger 115 clears these logging bit(s) when the cache line is no longer considered by the cache entry logger 115 to be logged on behalf of a recording context, such as when the cache line is written to by a non-logged entity, when the cache line is invalidated, etc. Thus, in some embodiments, when the cache entry logger 115 utilizes logging bits the ending cache event identifier 119 may identify a second cache event comprising clearing of one or more logging bits associated with the cache line. As such, in some embodiments of act 603, the second cache event comprises a clearing of a logging bit associated with the cache line. Additionally, in some embodiments, when the cache entry logger 115 utilizes logging bits the ending cache event identifier 119 may identify a second cache event (e.g., based on occurrence of execution event 508d or execution event 508h) comprising an eviction of a cache line from a recording cache level, where the cache line is considered by the cache entry logger 115 to be presently logged (i.e., because it has one or more associated logging bits set at the time of the eviction). As such, in some embodiments of act 603, the second cache event comprises an eviction of the cache line from a recording cache level, wherein the cache line has a logging bit associated with the cache line set. In embodiments, identifying a second cache event comprising clearing of a logging bit associated with the cache line and/or an eviction of the cache line from a recording cache level (where the cache line has a logging bit associated with the cache line set) has a technical effect of identifying an ending of a cache line lifetime based on when the cache line is no longer considered logged, and/or when the cache line was evicted from the recording cache level.

In another example, the cache entry logger 115 utilizes memory markings as logging cues. As mentioned, in some embodiments, when there is an eviction of a cache line, the control logic 109 performs a lookup in the TLB 108 to determine if the cache line corresponded to a logged or non-logged memory region (e.g., memory page). Thus, in some embodiments of act 603, the second cache event comprises an eviction of the cache line. In embodiments, identifying a second cache event comprising an eviction of the cache line has a technical effect of identifying an ending of a cache line lifetime based on when the cache line was evicted from the recording cache level.

As mentioned, in embodiments, when there is an eviction of a cache line, the control logic 109 performs a lookup (e.g., in the TLB 108) to determine if the cache line corresponds to a logged or non-logged memory page. However, since it is possible that a cache line exists in the memory cache 107, but there is no corresponding live TLB entry for that cache line (i.e., because the appropriate TLB entry was already evicted), some embodiments log cache line lifetime hints that indicate when logged TLB entries are evicted from the TLB 108, or update a cache line-specific flag (e.g., a logging bit associated with the cache entry, a cache line tag, a bit within a data structure in system memory 103, etc.) to indicate whether or not the cache line's corresponding memory page is logged. Thus, in embodiments, the microprocessor logs an indication a logged TLB entry has been evicted, and/or logs an indication that a memory page associated with the cache line is being logged (e.g., in act 604).

In another example, the cache entry logger 115 utilizes upper-level cache tagging, which enables two (or more) time-windows to be bridged/merged. In these embodiments, the ending cache event identifier 119 identifies events in the upper-level cache that can signal when the value a cache line has (or has not) changed in the upper-level cache. As such, in some embodiments of act 603, the second cache event comprises an eviction of the cache line from a cache level backing a recording cache level. In other embodiments of act 603, the second cache event comprises a clearing of a tag associated with the cache line within a cache level backing a recording cache level. In embodiments, identifying a second cache event comprising an eviction of the cache line from a cache level backing a recording cache level and/or clearing of a tag associated with the cache line within a cache level backing a recording cache level has a technical effect of identifying when the value of the cache line in the cache level backing a recording cache level can be relied upon to bridge/merge time-windows.

Based at least on the occurrence of act 603, method 600 also comprises an act 604 of initiating logging of the second trace information indicative of an ending of the lifetime for the cache line, the second information linkable with the first trace indicative of the beginning of the lifetime for the cache line. In embodiments, act 604 comprises, based on detecting the second cache event, initiating logging, into the execution trace, second trace information indicating an ending of the lifetime of the cache line within the memory cache. In embodiments, act 604 has a technical effect of enabling the processor 102 to record information indicative of the ending lifetime of the cache line during trace recording. In an example of act 604, based on identification of the ending cache event in act 603, the ending cache event logger 120 logs into replayable execution trace 112 information (e.g., one of trace entry 507*c*, trace entry 507*d*, trace entry 507*g*, or trace entry 507*h* of example 500) that is usable to identify when (i.e., in terms of execution time) the second cache event occurred during recording of replayable execution trace 112. This information is usable to identify an ending of at least one time-window that ends the lifetime of the lifetime for the cache line first discussed in connection with act 601. In embodiments, a type of the second trace information varies, and particularly in view of the bit-accurate tracing technique (or techniques) being employed by the cache entry logger 115.

In one example, the second cache event comprises the latest consumption of the cache line (e.g., execution event 508*c* or execution event 508*g*) prior to its eviction. Thus, in some embodiments of act 604, the second trace information comprises an indication of the consumption. In embodiments, initiating logging of first trace information comprising an indication of a consumption has a technical effect enabling identification of an ending of a cache line lifetime based on when the cache line was last consumed by a traced entity.

In another example, the cache entry logger 115 utilizes way locking. In some embodiments, when the cache entry logger 115 utilizes way locking, the ending cache event logger 120 initiates logging of an indication (e.g., trace entry 507*d* or trace entry 507*h*) of when the cache line was evicted (e.g., from a recording cache level, from a recording way, etc.). Thus, in some embodiments of act 604, the second trace information comprises an indication of the eviction (e.g., from the recording cache level, from the recording way, etc.); more particularly, in some embodiments of act 604, the second trace information comprises an indication usable to determine that the cache line was evicted from the recording way. In embodiments, initiating logging of second trace information comprising an indication of an eviction has a technical effect of enabling identification of an ending of a cache line lifetime based on when the cache line was evicted. Notably, in some embodiments, the indication of the eviction is inherent, rather than express. For example, if the cache line is evicted from a particular cache entry due to its replacement by another cache line that is also logged, logging of an influx of the replacement cache line implies the eviction; thus, in these situations, the second trace information comprises the logging of the replacement cache line.

In another example, the cache entry logger 115 utilizes logging bits within at least a recording cache level of the memory cache 107. In some embodiments, when the cache entry logger 115 utilizes logging bits, in act 603 the ending cache event identifier 119 identifies a second cache event comprising a clearing of a logging bit associated with the cache line, and the ending cache event logger 120 initiates logging of an indication of the clearing of the logging bit. Thus, in some embodiments of act 604, the second trace information comprises an indication that a logging bit associated with the cache line was cleared. Additionally, in some embodiments, when the cache entry logger 115 utilizes logging bits, in act 603 the ending cache event identifier 119 identifies an eviction of the cache line from a recording cache level with the cache line having a logging bit associated with the cache line set, and the ending cache event logger 120 initiates logging of an indication (e.g., trace entry 507*d* or trace entry 507*h*) of the eviction. Thus, in some embodiments of act 604, the second trace information comprises an indication that the cache line was evicted, and this second trace information is logged based at least on determining that a logging bit associated with the cache line is set. In embodiments, initiating logging of second trace information comprising an indication of clearing of a logging bit and/or eviction of a cache line enabling identification of an ending of a cache line lifetime based on when the cache line can no longer be considered logged and/or when the cache line was evicted.

In another example, the cache entry logger 115 utilizes memory markings as logging cues. In some embodiments, when the cache entry logger 115 utilizes memory markings as logging cues, in act 603 the ending cache event identifier 119 identifies a second cache event comprising an eviction of the cache line, and the ending cache event logger 120 initiates logging of an indication of the eviction. Thus, in some embodiments of act 604, the microprocessor initiates logging of second trace information that indicates that the cache line was evicted, based at least on determining that there exists, within the TLB, a particular TLB entry associated with the cache line that indicates that consumptions from a corresponding particular memory page should be logged. However, the cache event identifier 119 may also perform a lookup (e.g., in the TLB 108) to determine if the cache line corresponds to a logged or non-logged memory page. In embodiments, the ending cache event logger 120 also logs an indication that a logged TLB entry has been evicted, and/or logs an indication that a memory page associated with the cache line is being logged. Thus, in some embodiments of act 604, the microprocessor initiates logging of one or more indications that one or more logged TLB entries have been evicted from the TLB, based at least on determining that each of the one or more logged TLB entries indicates that consumptions from a corresponding memory page should be logged. In other embodiments of act 604, the microprocessor initiates logging of one or more indications that a memory page associated with the cache line is being logged.

In another example, the cache entry logger 115 utilizes upper-level cache tagging. In some embodiments, when the cache entry logger 115 utilizes upper-level cache tagging in act 603 the ending cache event identifier 119 identifies an event in the upper-level cache that signals when the value a cache line has (or has not) changed in the upper-level cache, and the ending cache event logger 120 initiates logging of an indication of this event. In some embodiments of act 604, the second trace information comprises an indication of the eviction from the cache level backing the recording cache level. In other embodiments of act 604, the second trace information comprises an indication of the clearing of the tag associated with the cache line. In embodiments, initiating logging of second trace information comprising an indication of the eviction from the cache level backing the recording cache level and/or an indication of the clearing of the tag associated with the cache line has a technical effect of enabling identification of when the value of the cache line in the cache level backing a recording cache level can be relied upon to bridge/merge time-windows.

In embodiments, operation of method 600 enables one or more windows of validity to be later identified from execution traces. Thus, method 600 leads to a benefit and technical effect of having recorded an execution trace that is enriched with data that facilitates trace analysis. Notably, the logging cache line lifetime hints is intrinsically linked to internal structure and operation of a processor, including internal structure and operation of its cache. For example, in embodiments, cache line lifetime hints precisely capture the beginning and ending of cache line lifetimes as they relate to execution of target code, thereby creating a detailed record of internal operation of relevant portions of a processor during code execution. The manner of the logging cache line lifetime hints therefore takes into account details of internal processor hardware and/or low-level aspects of operation of the processor.

In embodiments, as a result of operation of method 600, the first trace information and the second trace information are usable to associate the first cache event with the second cache event, and thereby enable an identification of the lifetime of the cache line within the memory cache using the execution trace. Thus, in embodiments, method 600 enables a microprocessor to (i) identify the first trace information and the second trace information from the execution trace, and (ii) use the first trace information and the second trace information to determine the lifetime of the cache line. In embodiments, in addition to the technical effects afforded by the logging of cache line lifetime hints into execution traces as a result of operation of method 600, the presence of these cache line lifetime hints in an execution trace recorded using method 600 enables a narrowing of analysis windows (i.e., reduced search spaces) for many types of trace analysis (e.g., memory leak analysis, data race analysis, etc.). These narrowed analysis windows lead to increased efficiency of trace analysis (e.g., by enabling an analysis to complete while processing/analyzing less trace data than would otherwise be possible), and to the conservation of computing resources during trace analysis (e.g., less processor utilization, less memory utilization, etc.).

Accordingly, at least some embodiments described herein log cache line lifetime hints when recording execution traces, enabling the identification of a time-window (and even multiple discontinuous time-windows) during which a logged value of a cache line is valid from a trace replay perspective. Some embodiments log cache line lifetime hints that are at least sufficient to identify time-window(s) during which a cache line value captured by an execution trace is guaranteed be the value that hardware stored during corresponding time-window(s) of execution time during trace recording. Some additional embodiments also log cache line lifetime hints that are additionally sufficient to expand at least one of these time-window(s) to also include at least one period of execution time during which the logged value of a cache line can also be trusted for replay purposes, even if that value does not necessarily match the value that the hardware stored during corresponding time-window(s) of execution time during trace recording.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a microprocessor that comprises a processing unit and a memory cache, the method comprising:

based on executing a first instruction at the processing unit, detecting occurrence of a first cache event that initiates a lifetime of a cache line within the memory cache;

based on detecting the first cache event, initiating logging, into an execution trace, first trace information indicating a beginning of the lifetime of the cache line within the memory cache;

subsequent to initiating logging of the first trace information, and based on executing a second instruction at the processing unit, detecting occurrence of a second cache event that ends the lifetime of the cache line within the memory cache; and based on detecting the second cache event, initiating logging, into the execution trace, second trace information indicating an ending of the lifetime of the cache line within the memory cache.

2. The method of claim 1, wherein the first cache event comprises an influx of the cache line within the memory cache.

3. The method of claim 1, wherein the first cache event comprises a consumption of the cache line by the processing unit, and wherein the first trace information comprises an indication that a logging bit associated with the cache line was set.

4. The method of claim 1, wherein the second cache event comprises a consumption of the cache line by the processing unit, and wherein the second trace information comprises an indication of the consumption.

5. The method of claim 1, wherein the second cache event comprises an eviction of the cache line from a recording cache level, and wherein the second trace information comprises an indication of the eviction from the recording cache level.

6. The method of claim 1, wherein the second cache event comprises an eviction of the cache line from a cache level backing a recording cache level, and wherein the second trace information comprises an indication of the eviction from the cache level backing the recording cache level.

7. The method of claim 1, wherein the second cache event comprises a clearing of a tag associated with the cache line within a cache level backing a recording cache level, and wherein the second trace information comprises an indication of the clearing of the tag associated with the cache line.

8. The method of claim 1, wherein the first cache event comprises an influx of the cache line into a recording way within the memory cache, and wherein the first trace information comprises an identification of the recording way.

9. The method of claim 8, wherein the second trace information comprises an indication usable to determine that the cache line was evicted from the recording way.

10. The method of claim 1, wherein the second trace information comprises an indication that a logging bit associated with the cache line was cleared.

11. The method of claim 1, wherein the second cache event comprises an eviction of the cache line, and wherein the method further comprises initiating logging of the second trace information, which indicates that the cache line was evicted, based at least on determining that a logging bit associated with the cache line is set.

12. The method of claim 1, wherein the microprocessor also comprises a translation lookaside buffer (TLB), the second cache event comprises an eviction of the cache line, and the method further comprises:
   initiating logging, into the execution trace, one or more indications that one or more logged TLB entries have been evicted from the TLB, based at least on determining that each of the one or more logged TLB entries indicates that consumptions from a corresponding memory page should be logged; and
   initiating logging of the second trace information, which indicates that the cache line was evicted, based at least on determining that there exists, within the TLB, a particular TLB entry associated with the cache line that indicates that consumptions from a corresponding particular memory page should be logged.

13. The method of claim 1, wherein the microprocessor also comprises a translation lookaside buffer, and wherein the method further comprises recording an indication that a memory page associated with the cache line is being logged.

14. The method of claim 1, wherein the first trace information comprises an indication that execution of the first instruction at the processing unit caused a request for the cache line.

15. The method of claim 14, wherein the method further comprises, prior to initiating logging of the first trace information, ensuring that the cache line is not modified by another processing unit after the request for the cache line and before an influx of the cache line.

* * * * *